United States Patent
Hashimoto et al.

(10) Patent No.: US 8,385,252 B2
(45) Date of Patent: Feb. 26, 2013

(54) MOBILE TERMINAL AND COMMUNICATION CONTROL METHOD

(75) Inventors: Jun Hashimoto, Yokohama (JP); Hisashi Takeshita, Yokosuka (JP); Kentaro Itagaki, Yokosuka (JP); Nobuaki Sasao, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 418 days.

(21) Appl. No.: 12/610,824

(22) Filed: Nov. 2, 2009

(65) Prior Publication Data

US 2010/0118762 A1 May 13, 2010

(30) Foreign Application Priority Data

Nov. 7, 2008 (JP) ................. 2008-286652

(51) Int. Cl.
*H04B 7/14* (2006.01)
(52) U.S. Cl. ........................ 370/315; 455/445
(58) Field of Classification Search .................. 370/315; 455/445
See application file for complete search history.

(56) References Cited

U.S. PATENT DOCUMENTS

| 2005/0070326 | A1* | 3/2005 | Morton ................. 455/552.1 |
| 2007/0237094 | A1 | 10/2007 | Bi et al. |
| 2008/0101325 | A1* | 5/2008 | Bao et al. .................. 370/345 |

FOREIGN PATENT DOCUMENTS

| EP | 1 734 774 A1 | 12/2006 |
| JP | 2004-363700 | 12/2004 |
| JP | 2005-217994 | 8/2005 |
| JP | 2007-104417 | 4/2007 |
| JP | 2008-60742 | 3/2008 |
| JP | 2008-228012 | 9/2008 |

OTHER PUBLICATIONS

Exteded European Search Report issued Oct. 28, 2010, in Application No. 09175228.7-1249 / 2184951.
Communication pursuant to Article 94(3) EPC issued Jun. 15, 2012, in European Patent Application No. 09 175 228.7.
Office Action issued Apr. 1, 2012 in Chinese Patent Application No. 200910220842.7 (with English translation).

* cited by examiner

*Primary Examiner* — Sai-Ming Chan
(74) *Attorney, Agent, or Firm* — Oblon, Spivak, McClelland, Maier & Neustadt, L.L.P.

(57) ABSTRACT

An object is to realize execution of an access point function while keeping power consumption low. A cell phone 1 has a relay unit 16 for relaying data transmitted between a digital camera 5 and a network, and a relay controller 17 for changing an operation state of the relay unit 16, based on a location state in a mobile communication network 2 derived based on a reception situation of a signal from a base station 2a of the mobile communication network 2, and a location information in a wireless LAN 3 derived based on a reception situation of a signal from a base station 3a of the wireless LAN 3.

4 Claims, 6 Drawing Sheets

| SSID LIST IN CELL PHONE |
|---|
| 121212 |
| 565656 |

(b)

| SSID LIST IN DIGITAL CAMERA |
|---|
| 121212 |
| 565656 |
| 787878 |

Fig.5

MOBILE TERMINAL AND COMMUNICATION CONTROL METHOD

BACKGROUND OF THE INVENTION

1. Field of the Invention

The present invention relates to a mobile terminal with a data relay function, and a communication control method thereof.

2. Related Background Art

In general wireless LAN communication, an access point at public facilities or at home is connected through a broadband line to a network and a session is established between a communication terminal with a wireless LAN function and the access point to enable the communication terminal to implement communication with the network. Examples of such communication terminals with the wireless LAN function include personal computers, game machines, cell phones, and so on. For example, Patent Document 1 below describes a radio communication device (cell phone) capable of quickly seeking out an access point while keeping power consumption low. This radio communication device is configured to attempt access to only a specific access point corresponding to access auxiliary information for control on an access start to the access point, and to perform activation control of a local radio transmission/reception processing unit used in communication with the access point.

Patent Document 1: Japanese Patent Application Laid-open No. 2008-60742

SUMMARY OF THE INVENTION

If the function of the access point is loaded on such a mobile terminal as a cell phone, the communication terminal can perform communication with the network through the mobile terminal even at places where there is neither a home wireless LAN nor a public wireless LAN. However, the mobile terminal serving as the access point needs to continuously transmit a beacon signal carrying information necessary for the communication, and this leads to increase in power consumption at the mobile terminal. Since the conventional access points are fixed facilities, there is no need for extra power saving means. In contrast, the mobile terminal operating with a battery is preferably configured so as to reduce power consumption.

The present invention has been accomplished in order to solve the above problem and an object of the present invention is to provide a mobile terminal capable of executing the access point function while keeping power consumption low, and a communication control method thereof.

A mobile terminal according to the present invention is a mobile terminal comprising: relay means for relaying data transmitted between another communication terminal and a network; and change means for changing an operation state of the relay means, based on a location state in a mobile communication network derived based on a reception situation of a signal from a base station of the mobile communication network, and a location state in a radio communication network different from the mobile communication network, derived based on a reception situation of a signal from a base station of the radio communication network.

A communication control method according to the present invention is a communication control method in a mobile terminal with relay means for relaying data transmitted between another communication terminal and a network, the communication control method comprising: a change step of changing an operation state of the relay means, based on a location state in a mobile communication network derived based on a reception situation of a signal from the mobile communication network, and a location state in a radio communication network different from the mobile communication network, derived based on a reception situation of a signal from the radio communication network.

Since these mobile terminal and communication control method are configured to change the operation state of the relay means functioning as an access point, based on the location states of the mobile terminal in the mobile communication network and in the radio communication network, it becomes feasible to execute the access point function while keeping power consumption low.

The mobile terminal of the present invention is preferably configured as follows: it further comprises storage means for storing an identifier to specify the radio communication network; the change means activates the relay means if the mobile terminal is located inside an area of the mobile communication network, if the mobile terminal is located inside an area of the radio communication network, and if the identifier of the radio communication network included in the signal from the radio communication network is not stored in the storage means.

In this case, the relay means is activated where the mobile terminal is located inside the both areas of the mobile communication network and the radio communication network and where the identifier of the base station of the radio communication network is not stored in the mobile terminal. In this configuration, the relay means is activated when the other terminal cannot connect to the network through the radio communication network; thus an operating time of the relay means is reduced. As a consequence, the power consumption of the mobile terminal is kept low.

Since these mobile terminal and communication control method are configured to change the operation state of the relay means functioning as an access point, based on the location states of the mobile terminal in the mobile communication network and in the radio communication network, it is feasible to execute the access point function while keeping power consumption low.

DESCRIPTION OF THE PREFERRED EMBODIMENTS

Embodiments of the present invention will be described below in detail with reference to the accompanying drawings. In the embodiments the mobile terminal according to the present invention is applied to a cell phone. In the description of the drawings identical or equivalent elements will be denoted by the same reference symbols, without redundant description.

Figure 1:
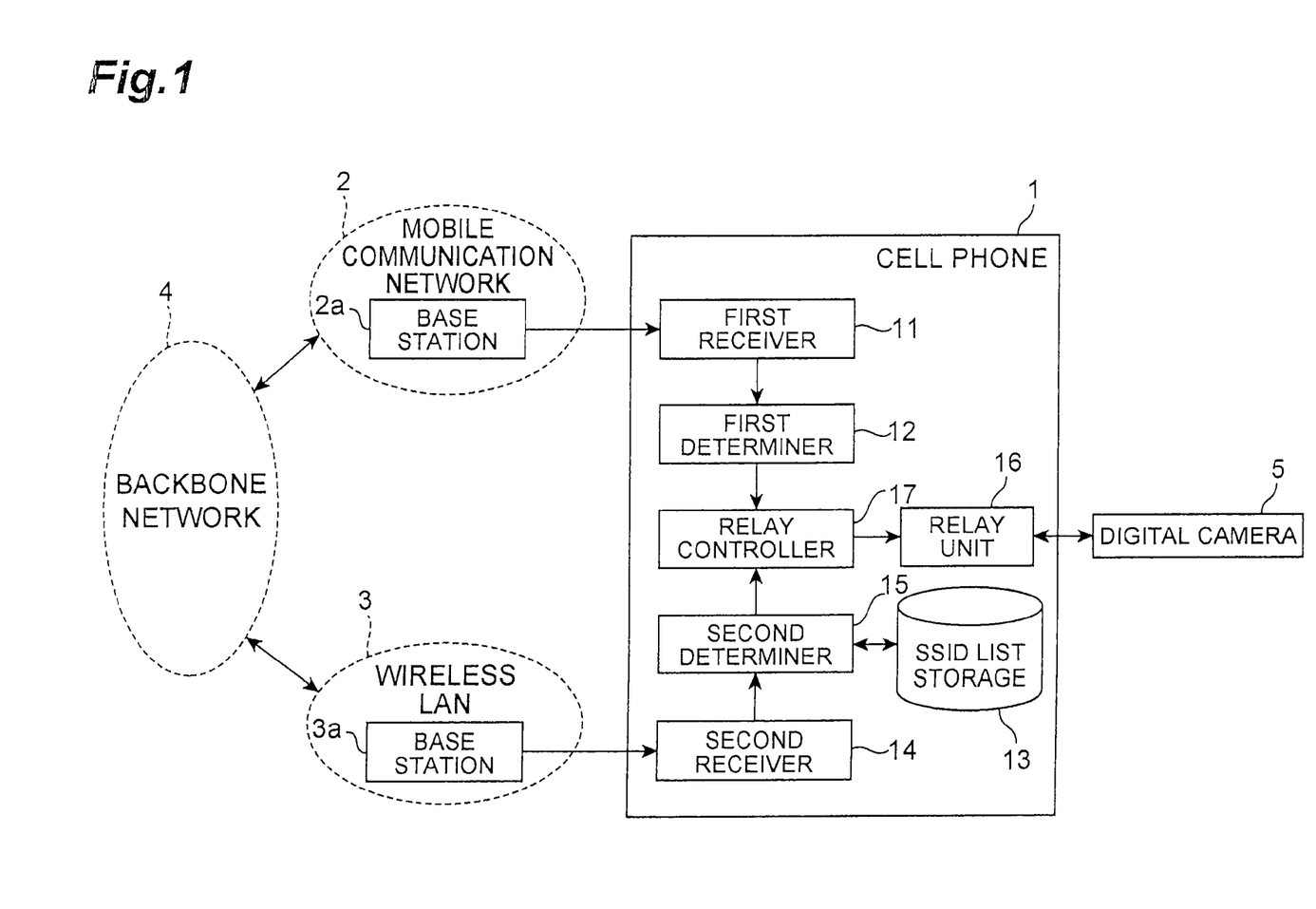
FIG. 1 is a drawing showing a functional configuration of a cell phone according to an embodiment.
Figure 2:
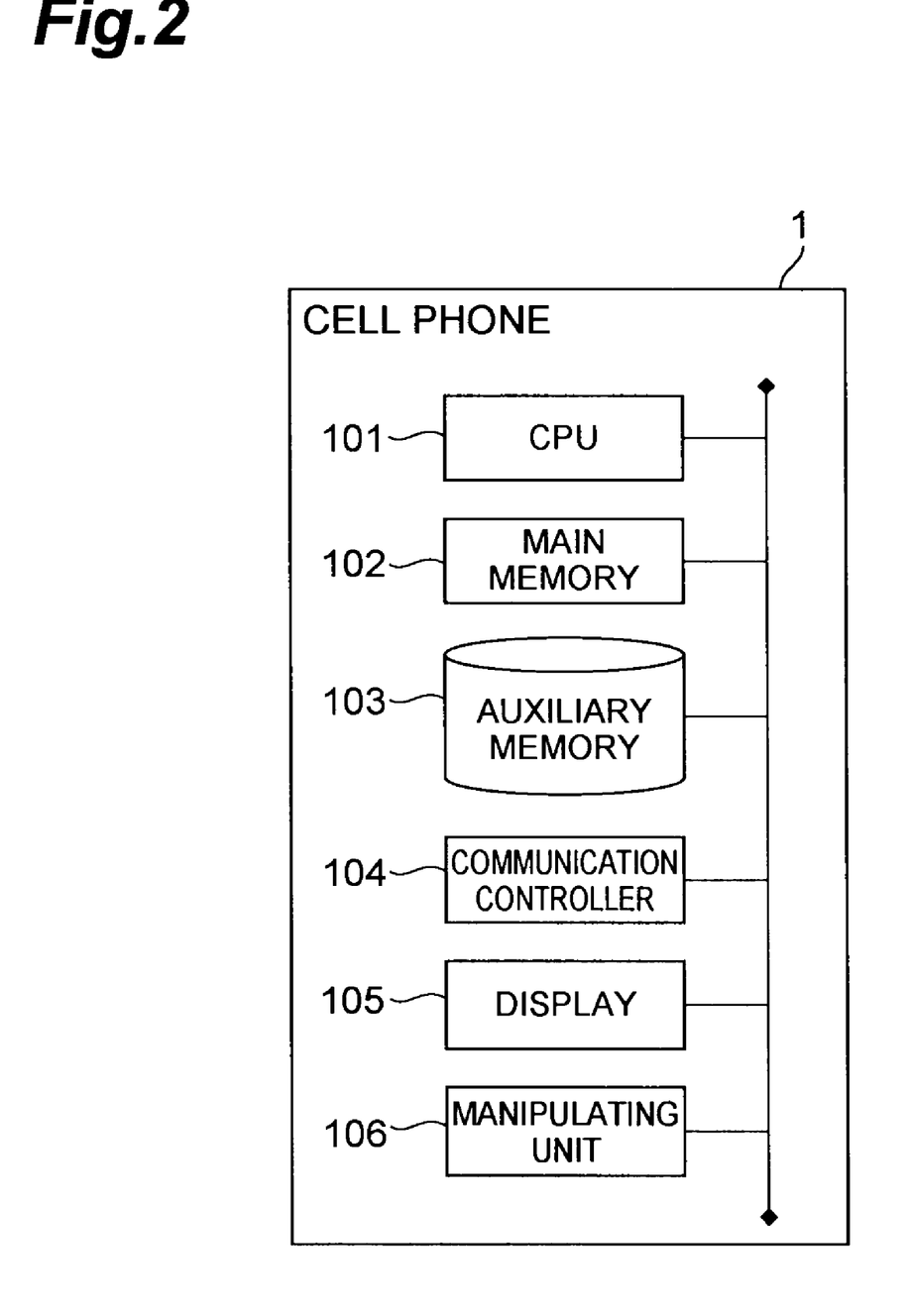
FIG. 2 is a drawing showing a hardware configuration of the cell phone shown in FIG. 1.
Figure 3:
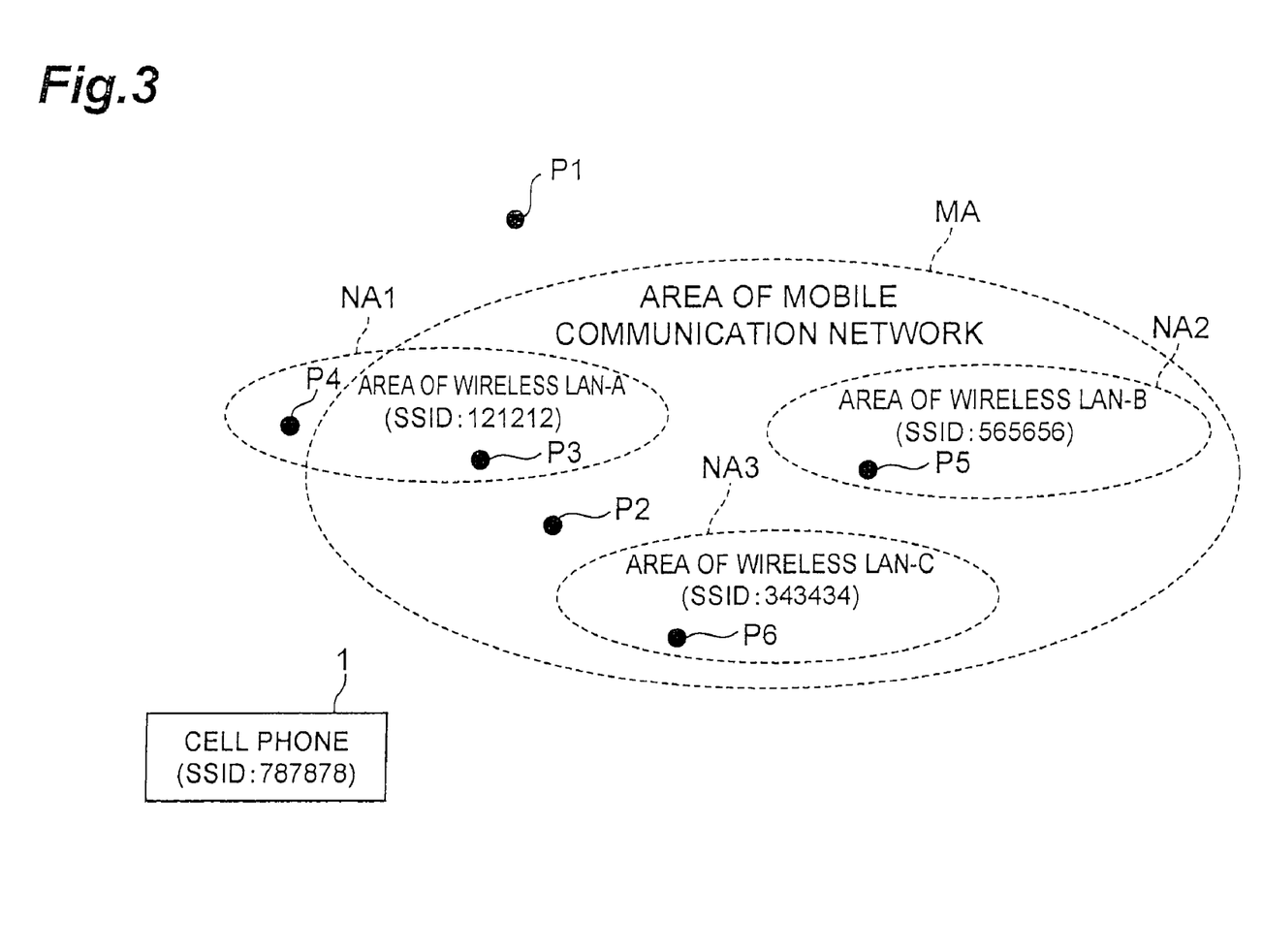
FIG. 3 is a drawing showing an example of relationship between communication areas and positions of a cell phone and a digital camera.
Figure 4:
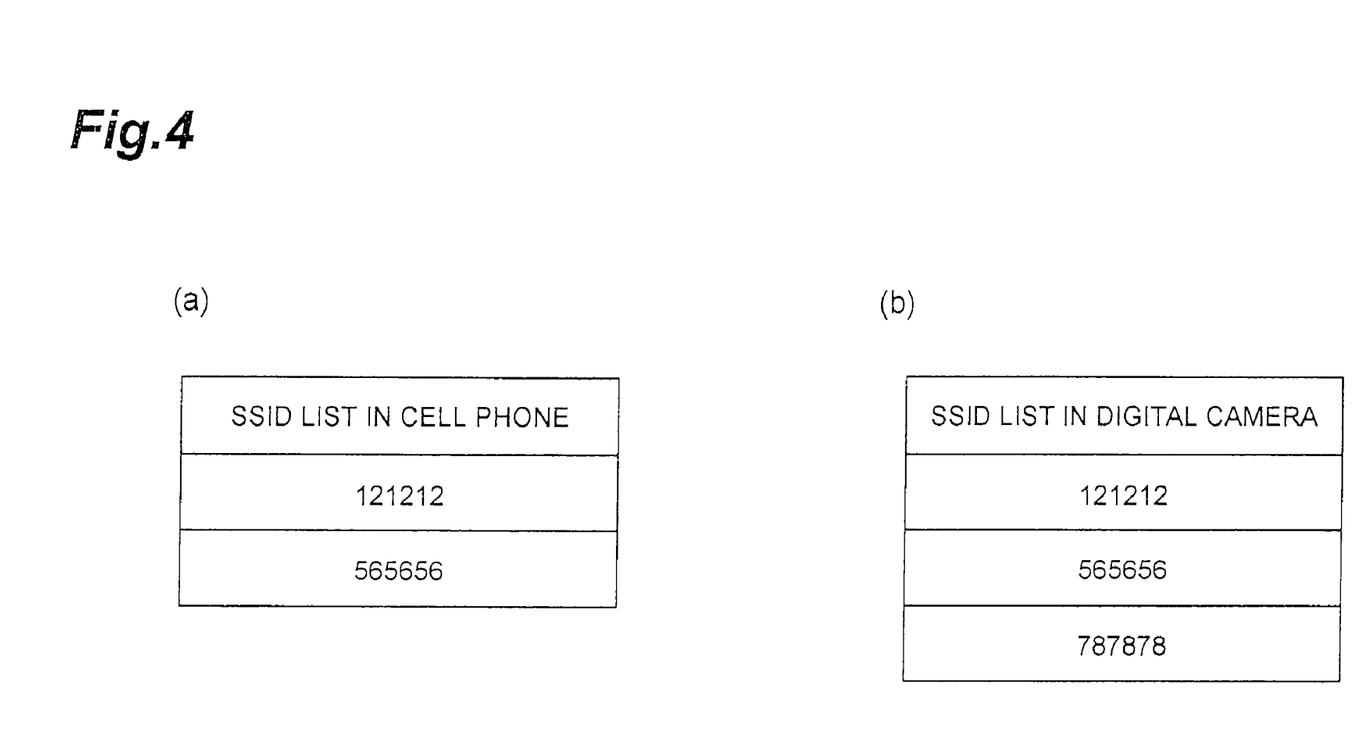
FIG. 4 is a drawing showing an example of SSIDs stored in a cell phone and in a digital camera.

First, configurations and functions of a cell phone according to an embodiment will be described using FIGS. 1 to 4. FIG. 1 is a drawing showing a functional configuration of the cell phone. FIG. 2 is a drawing showing a hardware configuration of the cell phone. FIG. 3 is a drawing showing an example of relationship between communication areas and positions of the cell phone and a digital camera. FIG. 4 is a drawing showing an example of service set identifiers (each of which will be referred to hereinafter as "SSID") stored in the cell phone and in the digital camera.

As shown in FIG. 1, the cell phone 1 can communicate with a mobile communication network 2 through transmission and reception of signals to and from a base station 2a forming the mobile communication network 2. Furthermore, the cell phone 1 can also communicate with a wireless LAN 3 through transmission and reception of signals to and from a base station 3a forming the wireless LAN 3. It is noted herein that the wireless LAN 3 is a communication network different from the mobile communication network 2. The mobile communication network 2 and the wireless LAN 3 are connected each to a backbone network 4.

The cell phone is equipped with an access point function to relay data transmitted between a digital camera (another communication terminal) 5 and the network. The digital camera 5 is equipped with a wireless LAN function.

The cell phone 1 has the following functional components: first receiver 11, first determiner 12, SSID list storage (storage means) 13, second receiver 14, second determiner 15, relay unit (relay means) 16, and relay controller (change means) 17.

As shown in FIG. 2, the cell phone 1 is composed of a CPU 101 to execute an operating system, an application program, and others, a main memory unit 102 composed of a ROM and a RAM, an auxiliary memory unit 103 composed of a memory or the like, a communication control unit 104 to perform data communication through the mobile communication network 2 or the wireless LAN 3, a display unit 105 composed of a liquid crystal monitor or the like, and a manipulating unit 106 composed of input keys or the like. Each of the functions shown in FIG. 1 is implemented by making predetermined software retrieved onto the CPU 101 and main memory unit 102, operating the communication control unit 104 under control of the CPU 101, and reading and writing data from and into the main memory unit 102 or the auxiliary memory unit 103.

Referring back to FIG. 1, the first receiver 11 is a part that receives broadcast information (signal) from the base station 2a of the mobile communication network 2. The first receiver 11 outputs the received broadcast information to the first determiner 12.

The first determiner 12 is a part that determines a location state of the cell phone 1 in the mobile communication network 2, based on a reception situation of the signal from the base station 2a of the mobile communication network 2. For example, the first determiner 12 determines that the cell phone 1 is located inside the area of the mobile communication network 2, if the first receiver 11 receives the broadcast information; otherwise, it determines that the cell phone 1 is located outside the area of the mobile communication network 2. The first determiner 12 outputs the determination result as first location information to the relay controller 17. The first location information is information indicative of whether the cell phone 1 is located in the mobile communication network 2 and, as described above, it is derived based on the reception situation of the broadcast information from the base station 2a of the mobile communication network 2.

The SSID list storage 13 is a part that stores SSIDs (identifiers) to specify radio communication networks. The SSID list storage 13 stores SSIDs of wireless LANs to which connection and data relay operations are to be performed with priority over the cell phone 1. The SSID list storage 13 may store an SSID list received from the digital camera 5 or may store SSIDs entered by a user.

The second receiver 14 is a part that receives a beacon (signal) from the base station 3a of the wireless LAN 3. The beacon transmitted from the base station 3a includes its SSID. The second receiver 14 outputs the received beacon to the second determiner 15.

The second determiner 15 is a part that determines a location state of the cell phone 1 in the wireless LAN 3, based on a reception situation of the signal from the base station 3a of the wireless LAN 3. For example, the second determiner 15 determines that the cell phone 1 is located inside the area of the wireless LAN 3, if the second receiver 14 receives the beacon; otherwise, it determines that the cell phone 1 is located outside the area of the wireless LAN 3. Then the second determiner 15 outputs the determination result as second location information to the relay controller 17. The second location information is information indicative of whether the cell phone 1 is located in the wireless LAN 3 and, as described above, it is derived based on the reception situation of the beacon from the base station 3a of the wireless LAN 3.

Furthermore, the second determiner 15 extracts the SSID from the received beacon and checks whether the SSID is stored in the SSID list storage 13. Then the second determiner 15 outputs the check result as SSID information to the relay controller 17. The SSID information is information indicative of whether the SSID of the wireless LAN 3 being the sender of the received beacon is stored in the SSID list storage 13.

The relay unit 16 is a part that relays data transmitted between the digital camera (another communication terminal) 5 and the network. The relay unit 16 initiates or terminates transmission of a beacon in accordance with a control signal input from the relay controller 17 described below. The beacon transmitted by the relay unit 16 includes an SSID of the cell phone 1. When a connection is established between the cell phone 1 and the digital camera 5 by transmission of the beacon, the relay unit 16 becomes able to relay data transmitted between the digital camera 5 and the mobile communication network 2, data transmitted between the digital camera 5 and the backbone network 4, and so on. At this time, the cell phone 1 functions as an access point.

The relay controller 17 is a part that changes an operation state of the relay unit 16, based on the location state in the mobile communication network 2 and the location state in the wireless LAN. The relay controller 17 controls the relay unit 16, based on the first location information, the second location information, and the SSID information.

The processing of the relay controller 17 will be specifically described using FIGS. 3 and 4. FIG. 3 shows an area MA of a mobile communication network, an area NA1 of wireless LAN-A, an area NA2 of wireless LAN-B, and an area NA3 of wireless LAN-C. The area MA includes a part of the area NA1, the whole of the area NA2, and the whole of the area NA3. It is assumed that the SSIDs of wireless LAN-A, wireless LAN-B, and wireless LAN-C are "121212," "565656," and "343434." Furthermore, the SSID of the cell phone 1 is assumed to be "787878."

It is also assumed that the SSID list storage 13 of the cell phone 1 stores the SSID "121212" of wireless LAN-A and the SSID "565656" of wireless LAN-B (cf. FIG. 4(a)). On the other hand, the digital camera 5 is assumed to store the SSID "121212" of wireless LAN-A, the SSID "65656" of wireless LAN-B, and the SSID "787878" of the cell phone 1 (cf. FIG. 4(*b*)).

First described is the processing carried out in a case where the cell phone 1 and the digital camera 5 are located at point P1. In this case, the relay controller 17 determines that the relay unit 16 is to be deactivated, based on the first location information indicative of the location outside the area of the mobile communication network and the second location information indicative of the location outside the areas of the wireless LANs (or indicating that the cell phone 1 is located in neither of the three wireless LAN areas). Then the relay controller 17 generates a control signal for controlling the relay unit 16 to transmit no beacon, and outputs it to the relay unit 16. This control signal makes the relay unit 16 stop transmission of the beacon or maintain its stopped state. As a result, the access point function of the cell phone 1 is deactivated and the digital camera 5 is unable to connect to the network.

When the cell phone 1 and the digital camera 5 are located at point 2, the relay controller 17 determines that the relay unit 16 is to be activated, based on the first location information indicative of the location inside the area MA and the second location information indicative of the location outside the areas of the wireless LANs. Then the relay controller 17 generates a control signal for controlling the relay unit 16 to transmit a beacon, and outputs it to the relay unit 16. This control signal makes the relay unit 16 start transmitting the beacon. As a result, the access point function of the cell phone 1 is activated and the digital camera 5 becomes connectable to the network.

When the cell phone 1 and the digital camera 5 are located at point P3, the relay controller 17 determines that the relay unit 16 is to be deactivated, based on the first location information indicative of the location inside the area MA, the second location information indicative of the location inside the area NA1, and the SSID information indicating that the SSID "121212" of the wireless LAN-A is stored in the SSID list storage 13. In this case, the digital camera 5 cannot connect to the network through the cell phone 1 but can connect to the network through the wireless LAN-A because the digital camera 5 itself stores the SSID of the wireless LAN-A inside.

When the cell phone 1 and the digital camera 5 are located at point P4, the relay controller 17 determines the relay unit 16 is to be deactivated, based on the first location information indicative of the location outside the area of the mobile communication network, the second location information indicative of the location inside the area NA1, and the SSID information indicating that the SSID "121212" of the wireless LAN-A is stored in the SSID list storage 13. In this case, the digital camera 5 can connect to the network through the wireless LAN-A as in the case where it is located at point P3.

When the cell phone 1 and the digital camera 5 are located at point P5, the relay controller 17 determines that the relay unit 16 is to be deactivated, based on the first location information indicative of the location inside the area MA, the second location information indicative of the location inside the area NA2, and the SSID information indicating that the SSID "565656" of the wireless LAN-B is stored in the SSID list storage 13. In this case, the digital camera 5 cannot connect to the network through the cell phone 1 but can connect to the network through the wireless LAN-B because the digital camera 5 itself stores the SSID of the wireless LAN-B inside.

When the cell phone 1 and the digital camera 5 are located at point P6, the relay controller 17 determines that the relay unit 16 is to be activated, based on the first location information indicative of the location inside the area MA, the second location information indicative of the location inside the area NA3, and the SSID information indicating that the SSID "343434" of the wireless LAN-C is not stored in the SSID list storage 13. In this case, the access point function of the cell phone is activated and thus the digital camera 5 becomes connectable to the network through the cell phone 1.

The six examples described above are summarized into (a) to (d) below.

(a) When the cell phone 1 and the digital camera 5 are located outside the area of the mobile communication network, the relay controller 17 deactivates the relay unit 16 (cf. the examples of points P1 and P4). This operation allows the cell phone 1 to avoid the unnecessary beacon transmission and power consumption owing thereto in the case where the network connection through the cell phone 1 cannot be expected.

(b) When the cell phone 1 and the digital camera 5 are located inside the area of the mobile communication network and outside the area of the wireless LAN, the relay controller 17 activates the relay unit 16 (cf. the example of point P2). This operation causes the relay unit 16 to be activated in the case where the digital camera 5 cannot connect to the network through the wireless LAN 3, and thus reduces the operating time of the relay means. As a consequence, the power consumption of the mobile terminal is kept low.

(c) When the cell phone 1 and the digital camera 5 are located inside the area of the mobile communication network and inside the area of the wireless LAN and when the SSID of the wireless LAN is stored in the SSID list storage 13, the relay controller 17 deactivates the relay unit 16 (cf. the examples of points P3 and P5). This operation allows the cell phone 1 to avoid the unnecessary beacon transmission and power consumption owing thereto in the case where the digital camera can connect to the network through the wireless LAN without use of the cell phone 1 or in the case where the wireless LAN is used with priority.

(d) When the cell phone 1 and the digital camera 5 are located inside the area of the mobile communication network and inside the area of the wireless LAN and when the SSID of the wireless LAN is not stored in the SSID list storage 13, the relay controller 17 activates the relay unit 16 (cf. the example of point P6). Since the relay unit 16 is activated where the digital camera 5 cannot connect to the network through the wireless LAN 3, the operating time of the relay means is reduced. As a consequence, the power consumption of the mobile terminal is kept low.

Figure 5:
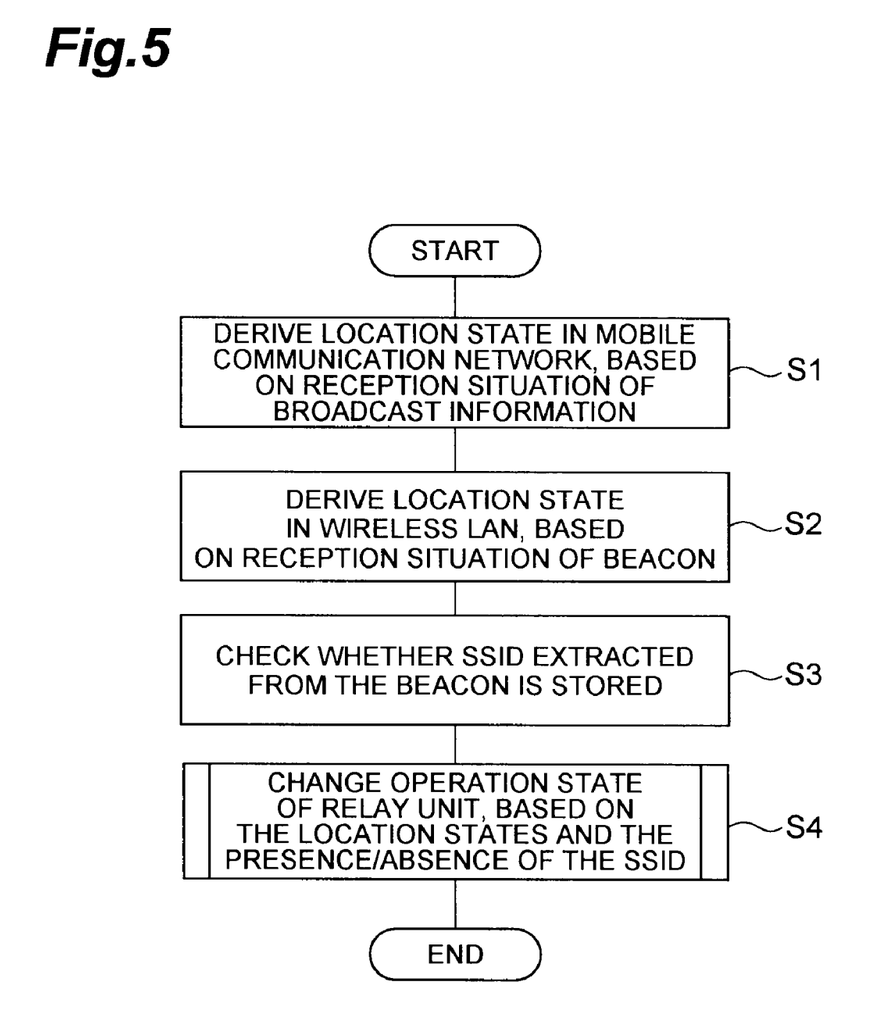
FIG. 5 is a flowchart showing an operation of the cell phone shown in FIG. 1.
Figure 6:
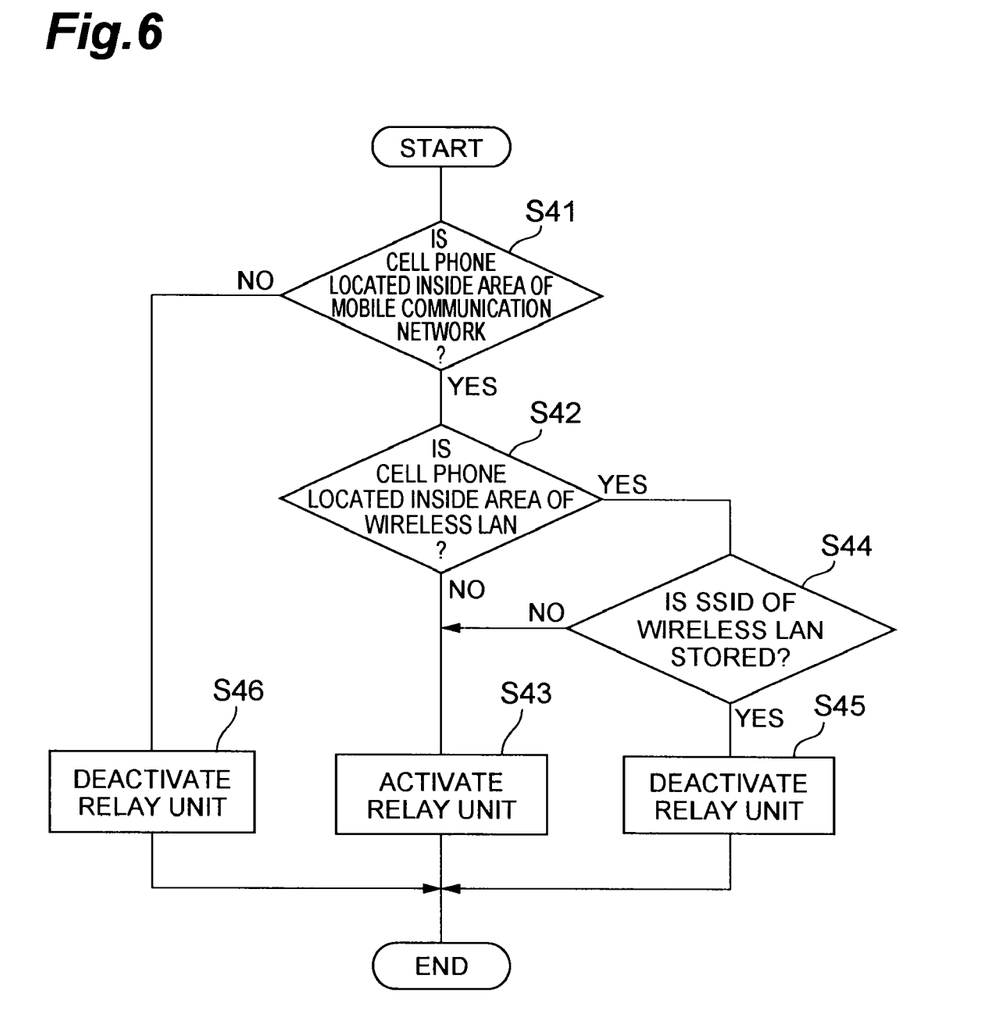
FIG. 6 is a flowchart showing the details of an operation state change process in FIG. 5.

The below will describe the operation of the cell phone 1 shown in FIG. 1 and a communication control method according to the present embodiment, using FIGS. 5 and 6. FIG. 5 is a flowchart showing the operation of the cell phone 1. FIG. 6 is a flowchart showing the details of an operation state change process in FIG. 5.

First, the first determiner 12 derives the location state in the mobile communication network 2, based on the reception situation of broadcast information in the first receiver 11, and outputs the result thereof as the first location information to the relay controller 17 (step Si). Next, the second determiner 15 derives the location state in the wireless LAN 3, based on the reception situation of the beacon in the second receiver 14, and outputs the result thereof as the second location information to the relay controller 17 (step S2). Thereafter, the second determiner 15 extracts the SSID from the received beacon and checks whether the SSID is stored in the SSID list storage 13 (step S3). The second determiner 15 outputs the check result as SSID information to the relay controller 17. Subsequently, the relay controller 17 changes the operation state of the relay unit 16, based on the location state in the mobile communication network 2 (first location information), the location state in the wireless LAN 3 (second location information), and the presence/absence of the SSID (SSID information) (step S4, change step).

Specifically, as shown in FIG. 6, when the cell phone 1 is located inside the area of the mobile communication network 2 (step S41; YES) and when the cell phone 1 is located outside the area of the wireless LAN 3 (step S42; NO), the relay controller 17 activates the relay unit 16 (step S43).

When the cell phone 1 is located inside the area of the mobile communication network 2 (step S41; YES) and when the cell phone 1 is located inside the area of the wireless LAN 3 (step S42; YES), the relay controller 17 determines whether the SSID of the wireless LAN 3 is stored in the SSID list storage 13 (step S44). If the received SSID is not stored in the SSID list storage 13 (step S44; NO), the relay controller 17 activates the relay unit 16 (step S43). On the other hand, if the received SSID is stored (step S44; YES), the relay controller 17 deactivates the relay unit 16 (step S45).

When the cell phone 1 is located outside the area of the mobile communication network (step S41; NO), the relay controller 17 deactivates the relay unit 16 (step S46).

In the present embodiment, as described above, the operation state of the relay unit 16 functioning as an access point is changed based on the location states of the cell phone 1 in the mobile communication network 2 and in the wireless LAN 3; therefore, it becomes feasible to execute the access point function while keeping the power consumption of the cell phone 1 low. In addition, the present embodiment improves convenience because the access point function is automatically activated or deactivated.

The present invention was described above in detail based on the embodiment thereof. However, the present invention is not limited only to the above embodiment. The present invention can be modified in many ways as described below, without departing from the scope and spirit of the invention.

The above embodiment showed the example wherein the cell phone 1 determined the location situation in the wireless LAN 3, but it is also possible to adopt a configuration wherein the digital camera 5 determines the location situation in the wireless LAN 3 and notifies the cell phone 1 of the determination result (equivalent to the second location information in the above embodiment). This configuration eliminates the need for the mobile terminal to determine the location situation in the radio communication network and thus reduces the load on the mobile terminal.

In the above embodiment the second determiner 15 determined the storage situation of the SSID included in the beacon, but the mobile terminal may be configured to change the operation state of the relay means while ignoring the SSID. For example, the mobile terminal may be so configured that the relay means is activated if the mobile terminal is located inside the area of the mobile communication network and outside the area of the radio communication network and that otherwise the relay means is deactivated. In this case, the mobile terminal does not have to be equipped with the component corresponding to the foregoing SSID list storage 13.

The above embodiment showed the wireless LAN 3 as the radio communication network, but there are no restrictions on the type of the radio communication network. For example, the present invention is also applicable to systems using WiMAX (Worldwide Interoperability for Microwave Access). Furthermore, there are no restrictions on the type of the mobile communication network, either. For example, the present invention is also applicable to systems using W-CDMA (Wideband Code Division Multiple Access), CDMA-2000, or LTE (Long Term Evolution).

The above embodiment showed the example of the cell phone 1 and the digital camera 5 as the mobile terminal and the other communication terminal, but there are no restrictions on the type of the mobile terminal, and the type of the communication terminal configured to communicate through the mobile terminal. For example, a personal digital assistant (PDA) can be the mobile terminal and a portable game machine or portable music player can be the other communication terminal.

What is claimed is:

1. A mobile terminal comprising:
   a relay unit that relays data transmitted between another communication terminal and a network;
   a change unit that changes an operation state of the relay unit between activated relay unit and deactivated relay unit based on a location state in a mobile communication network derived based on a reception situation of a signal from a base station of the mobile communication network, and a location state in a radio communication network different from the mobile communication network, derived based on a reception situation of a signal from a base station of the radio communication network; and
   a storage unit that stores an identifier specifying the radio communication network, wherein
   the change unit activates the relay unit if the mobile terminal is located inside an area of the mobile communication network, if the mobile terminal is located inside an area of the radio communication network, and if the identifier of the radio communication network included in the signal from the radio communication network is not stored in the storage unit.

2. A communication control method in a mobile terminal with a relay unit that relays data transmitted between another communication terminal and a network, the communication control method comprising:
   storing in a storage unit an identifier specifying a radio communication network; and
   changing an operation state of the relay unit between activated relay unit and deactivated relay unit based on a location state in a mobile communication network derived based on a reception situation of a signal from the mobile communication network, and a location state in the radio communication network different from the mobile communication network, derived based on a reception situation of a signal from the radio communication network, wherein
   the changing includes activating the relay unit if the mobile terminal is located inside an area of the mobile communication network, if the mobile terminal is located inside an area of the radio communication network, and if the identifier of the radio communication network included in the signal from the radio communication network is not stored in the storage unit.

3. The mobile terminal according to claim 1, wherein the relay unit functions as an access point, and the another communication terminal has a function of communicating through the radio communication network, which is different from the mobile communication network, and a network including the mobile communication network.

4. A mobile terminal comprising:
   a relay unit that functions as an access point that relays data transmitted between another communication terminal having a function of communicating through a radio communication network different from a mobile communication network and a network including the mobile communication network;
a first receiving unit that receives a signal from a base station of the mobile communication network;
a first determining unit that determines, based on a reception situation of the signal received at the first receiving unit, whether the mobile terminal is located in the mobile communication network;
a second receiving unit that receives a signal from a base station of the radio communication network different from the mobile communication network;
a second determining unit that determines, based on a reception situation of the signal received by the second receiving unit, whether the mobile terminal is located in the radio communication network;
a storage that stores an identifier of a radio communication network to which connection and data relay operation is to be performed with priority over the mobile terminal; and
a change unit that changes an operation state of the relay unit based on a location state in the mobile communication network, and a location state in the radio communication network determined by the second determining unit, wherein the change unit is configured to:
  activate the relay unit if the mobile terminal is in the mobile communication network and out of the radio communication network;
  activate the relay unit if the mobile terminal is in the mobile communication network and in the radio communication network, and an identifier of the radio communication network included in the signal received by the second receiving unit is not stored in the storage;
  deactivate the relay unit if the mobile terminal is in the mobile communication network and in the radio communication network, and an identifier of the radio communication network included in the signal received by the second receiving unit is stored in the storage; and
deactivate the relay unit if the mobile terminal is out of the mobile communication network.

* * * * *